United States Patent [19]
Turner et al.

[11] 3,821,319
[45] June 28, 1974

[54] 1,2-DIPHENYL-ETHANE DERIVATIVES

[75] Inventors: John Cameron Turner, Kent; Rosalind Po-Kuen Chan, London, both of England

[73] Assignee: Biorex Laboratories Limited, London, England

[22] Filed: Sept. 21, 1971

[21] Appl. No.: 182,525

[30] Foreign Application Priority Data
Sept. 29, 1970 Great Britain.................... 46242/70

[52] U.S. Cl.............. 260/649, 260/590, 260/618 D, 260/646, 424/353
[51] Int. Cl........................................... C07c 25/00
[58] Field of Search................................ 260/649 F

[56] References Cited
OTHER PUBLICATIONS
Pratt et al., J. Am. Chem. Soc. 78, 4430–4433 (1956).
Chemical Abstracts, July–Dec. 1970 Subject Index Page 5875 1st Column.
Torf et al., Chem. Abstracts 56 362d (1962).

*Primary Examiner*—Daniel D. Horwitz
*Attorney, Agent, or Firm*—Wenderoth, Lind & Ponack.

[57] ABSTRACT

The present invention provides new 1,2-diphenyl-ethane derivatives of the general formula:

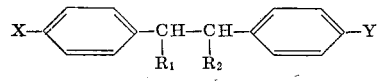

wherein $R_1$ and $R_2$, which may be the same or different, are alkyl radicals and X and Y, which may be the same or difrerent, are halogen atoms, with the proviso that when X and Y are both bromine or fluorine atoms, then $R_1$ and $R_2$ are not both methyl or ethyl radicals.

2 Claims, No Drawings

1,1-DIPHENYL-ETHANE DERIVATIVES

BACKGROUND OF THE INVENTION

There is an increasing demand for compounds which have contraceptive properties, even when administered in extremely small quantities, which do not exhibit undesired side effects and which also have a very low toxicity.

It is known that certain 1,2-diphenyl-ethane derivatives exhibit contraceptive properties and the present invention provides a new group of 1,2-diphenyl-ethane derivatives which are superior to the known compounds of this general type.

SUMMARY OF THE INVENTION

Thus, according to the present invention, there are provided new 1,2-diphenyl-ethane derivatives of the general formula:

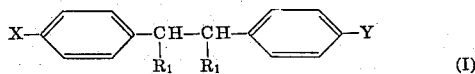
(I)

wherein $R_1$ and $R_2$, which may be the same or different, are alkyl radicals and X and Y, which may be the same or different, are halogen atoms, with the proviso that when X and Y are both bromine or fluorine atoms, then $R_1$ and $R_2$ are not both ethyl or methyl radicals.

DETAILED DESCRIPTION OF THE INVENTION

The alkyl radicals $R_1$ and $R_2$ preferably contain up to 6 carbon atoms and may have straight or branched chains. Examples of such alkyl radicals include methyl, ethyl, n-propyl, isopropyl, n-butyl, isobutyl, tert.-butyl, n-pentyl and n-hexyl radicals.

The new compounds according to the present invention can be prepared, for example, by the following multi-step synthesis:

A p-halobenzaldehyde of the general formula:

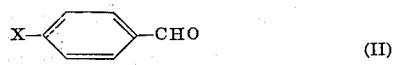
(II)

wherein X has the same meaning as above, is reacted with a nitroalkane of the general formula:

$$R_2-CH_2-NO_2 \quad (III)$$

wherein $R_2$ has the same meaning as above, to give a styrene derivative of the general formula:

(IV)

wherein X and $R_2$ have the same meanings as above. This is then converted, for example by reaction with ferric chloride, iron and water, into a ketone of the general formula:

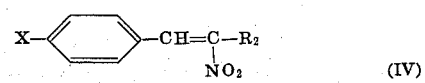
(V)

wherein X and $R_2$ have the same meanings as above, which ketone is, in turn, reacted with an appropriate alkyl halide, preferably an alkyl iodide, in the presence of an alkali metal hydride, preferably sodium hydride, to give a compound of the general formula:

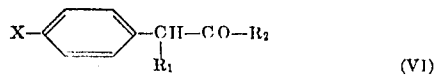
(VI)

wherein X, $R_1$ and $R_2$ have the same meanings as above, which, in turn, is reacted with Grignard reagent of the general formula:

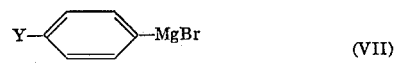
(VII)

wherein Y has the same meaning as above, to give a carbinol of the general formula:

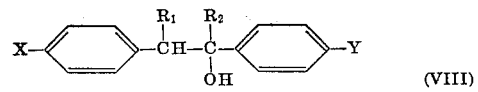
(VIII)

wherein $R_1$, $R_2$, X and Y have the same meanings as above, and this carbinol is then reduced to give the desired product (I), which is believed to have the erythro configuration.

In the case of the symmetrical compounds of general formula I (i.e. X= Y; $R_1 = R_2$), these can be prepared, for example, by reacting a halide of the general formula:

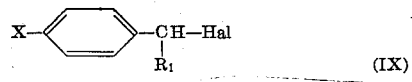
(IX)

wherein X and $R_1$ have the same meanings as above and Hal is a halogen atom, preferably a bromine atom, with magnesium to give the corresponding Grignard compound which then reacts with further free halide (IX), whereafter the reaction mixture is worked up in the usual manner with acidic ice water, such as a mixture of ice and dilute hydrochloric acid.

The following Examples are given for the purpose of illustrating the present invention:

EXAMPLE 1 a. p-Fluoro-α-methyl-nitrostyrene 10 g. methylamine hydrochloride and 10 g. anhydrous sodium acetate were added to a mixture of 50 g. p-fluorobenzaldehyde and 50 ml. distilled nitroethane. The reaction mixture was stirred for 2 days at ambient temperature and the solid product collected by suction filtration. After recrystallisation from ether, there were obtained 45 g. (64 percent of theory) p-fluoro-α-methyl-nitrostyrene; m.p. 60°–62°C.

b. p-Fluorophenyl-acetone 32 g. p-fluoro-α-methyl-nitrostyrene were added to a mechanically stirred mixture of 32.4 g. ferric chloride, 150 ml. water and 79 g. iron powder, followed by the dropwise addition of 30 ml. concentrated hydrochloric acid over the course of about 30 minutes. The reaction mixture was then heated under reflux for 2 hours, cooled and the product was isolated by extraction with ether. The ethereal extract was washed with dilute acid and water and then dried. The ether was removed to leave behind an oil which was fractionally distilled. There were obtained 23 g. (85 percent of theory) p-fluorophenyl-acetone; b.p. 75° – 76°C./0.3 mm.Hg.

c. 3-(p-Fluorophenyl)-pentan-2-one 6.4 g. sodium hydride (50 percent dispersion) were added portionwise to a solution of 20.3 g. p-fluorophenyl-acetone in 120 ml. dry dimethyl formamide, whereafter the mixture was stirred for 30 minutes at ambient temperature, after which time all the sodium hydride had dissolved. 30 g. ethyl iodide were then added, with stirring and cooling, over the course of about 15 minutes. After the initial reaction had subsided, the mixture was heated at 60° – 70°C. for 1 hour, cooled and diluted with water. The reaction mixture was extracted with ether, which was then washed, dried and distilled to remove the ether. Fractional distillation of the residue gave 23 g. (95 percent of theory) 3-(p-fluorophenyl)-pentan-2-one; b.p. 89° –92°C./0.3 mm.Hg.

d. 1-Methyl-1,2-di-(p-fluorophenyl)-butanol 4.9 g. magnesium were covered by anhydrous ether and, in an atmosphere of nitrogen, a crystal of iodine was added, followed by 1 ml. bromo-p-fluorobenzene. After the initial reaction had subsided, a solution of 35 g. bromo-p-fluorobenzene in 60 ml. ether was added at such a rate that the reaction mixture boiled gently. Thereafter, a solution of 15 g. lithium perchlorate in 100 ml. ether was added, followed by a solution of 18 g. 3-(p-fluorophenyl)-pentan-2-one in 50 ml. ether. The reaction mixture was heated under reflux for 5 hours, left to stand overnight at ambient temperature and then poured into a mixture of ice and hydrochloric acid. The product was isolated by extraction with ether. After removing the ether, the oily residue was fractionated by vacuum distillation. The major fraction (20 g.), which boiled at 125° – 135°C./0.3 mm.Hg., was chromatographed on a column of 300 g. alumina in benzene solution. Elution was with benzene containing 2 percent ether. There were obtained 15 g. 1-methyl-1,2-di-(p-fluorophenyl)-butanol which could not be crystallised.

e. Erythro-4,4'-difluoro-$\alpha$-ethyl-$\alpha'$-methyl-dibenzyl 15 g. 1-methyl-1,2-di-(p-fluorophenyl)-butanol in a mixture of 100 ml. glacial acetic acid and 0.2 ml. perchloric acid was shaken with hydrogen in the presence of 2 g. 10 percent palladium on charcoal until the uptake of hydrogen ceased. The reaction mixture was filtered and the product was isolated by extraction with ether. The ethereal extract was washed with a solution of sodium bicarbonate and then with water. THe ethereal solution was then dried and the ether removed. The residue obtained was recrystallised from methanol to give 8.5 g. (33 percent of theory) pure erythro-4,4'-difluoro-$\alpha$-ethyl-$\alpha'$-methyl-dibenzyl; m.p. 78° – 79°C.

EXAMPLE 2

Meso-4,4'-difluoro-$\alpha,\alpha'$-dipropyl-dibenzyl 1.7 g. (0.07 mole) magnesium and a small crystal of iodine were covered with anhydrous ether and, while stirring and gently heating under reflux, a solution of 32.4 g. (0.14 mole) 1-p-fluorophenyl-butyl bromide in 150 ml. anhydrous ether was added over the course of half an hour. After completion of the addition, the reaction mixture was heated under reflux for a further 15 hours and then poured into a mixture of ice and hydrochloric acid. The product was isolated by extraction with ether, drying the ethereal phase, removing the ether and fractional distillation of the residue. The fraction which distilled at 125° – 130°C./0.2 mm.Hg. was recrystallised from methanol to give 5.2 g. (24.2 percent of theory) meso-4,4'-difluoro-$\alpha,\alpha'$-dipropyl-dibenzyl; m.p. 96.5° – 97°C.

The present invention also includes within its scope pharmaceutical compositions containing one or more of the new compounds. These pharmaceutical compositions can be administered orally or parenterally in admixture with a solid or liquid pharmaceutical carrier.

Solid compositions for oral administration include compressed tablets, pills, dispersible powders and granules. In such solid compositions, at least one active compound according to the present invention is admixed with at least one inert diluent, such as tribasic calcium phosphate ($Ca_3(PO_4)_2$), starch, lactose, gelatine, acacia, sucrose, stearic acid, talc, algenic acid or sodium alginate. The compositions may also comprise, as is normal practice, additional substances other than inert diluents, for example, lubricating agents, such as magnesium stearate, as well as sweetening or flavouring agents.

The percentage of active ingredient in the compositions of the present invention may be varied, it being necessary that it should constitute a proportion such that a suitable dosage for the desired therapeutic effect shall be obtained. In general, the preparations of the present invention should be administered in an effective dose from about 0.00001 mg. to 1 mg. of active substance per kg. of body weight per day.

The following Example illustrates a pharmaceutical composition according to the present invention:

EXAMPLE 3

Ingredients for the preparation of 100,000 tablets, each containing 20 $\mu$g. of active material:

| | |
|---|---|
| erythro-4,4'-difluoro-$\alpha$-ethyl-$\alpha'$-methyl-dibenzyl | 2.00 g. |
| lactose | 3900.00 g. |
| starch | 998.00 g. |
| magnesium stearate | 100.00 g. |

The lactose was first milled to a fine powder and sieved into the bowl of a planetary or trough mixer. The dibenzyl derivative was dissolved in 100 ml. ethanol and mixed with the lactose, mixing being continued for 30 minutes. The starch was sieved and sufficient pure water added thereto to give a 10 percent by weight starch paste. After subtracting the amount needed for granulation, the remainder of the starch paste was introduced into the mixing vessel and mixing continued for 15 minutes. Granulation was then carried out with the calculated quantity of starch paste at ambient temperature and mixing continued for a further 15 minutes.

The granulate obtained was sieved through a 16 mesh screen, laid out in a thin layer and dried for 12 hours with forced ventilation at a temperature of 35° – 40°C. The dried granulate was then sieved through a 20 mesh screen and returned to the planetary or trough mixer. THe magnesium stearate was then sieved through a 60 mesh screen, added to the granulate and mixing continued for 30 minutes. The granulate was then compressed into 50 mg. tablets, each of which contained 20 μg. of the dibenzyl derivative.

When the above tablets are administered to human females after coitus, they prevent the onset of pregnancy.

We claim:
1. Erythro-4,4'-difluoro-α-ethyl-α'-methyl-dibenzyl.
2. Meso-4,4'-difluoro-α,α'-dipropyl-dibenzyl.

* * * * *